United States Patent
Heiskala et al.

(10) Patent No.: US 7,106,802 B1
(45) Date of Patent: Sep. 12, 2006

(54) APPARATUS, AND ASSOCIATED METHOD, FOR FORMING A MODULATED SIGNAL UTILIZING OTD AND TCM TECHNIQUES

(75) Inventors: Juha Heiskala, Irving, TX (US); John Terry, Garland, TX (US)

(73) Assignee: Nokia Corporation, Espoo (FI)

( * ) Notice: Subject to any disclaimer, the term of this patent is extended or adjusted under 35 U.S.C. 154(b) by 412 days.

(21) Appl. No.: 09/672,753

(22) Filed: Sep. 28, 2000

(51) Int. Cl.
*H04L 5/12* (2006.01)
*H04L 1/02* (2006.01)

(52) U.S. Cl. ...................... 375/265; 375/267
(58) Field of Classification Search ........... 375/265, 375/261, 267, 259
See application file for complete search history.

(56) References Cited

U.S. PATENT DOCUMENTS

| | | | | |
|---|---|---|---|---|
| 5,301,209 | A * | 4/1994 | Wei | 375/265 |
| 6,452,981 | B1 * | 9/2002 | Raleigh et al. | 375/299 |
| 6,516,037 | B1 * | 2/2003 | Wei | 375/264 |
| 6,600,776 | B1 * | 7/2003 | Alamouti et al. | 375/147 |

OTHER PUBLICATIONS

Alamouti et al., Trellis-Coded Modulation and Transmit Diversity: Design Criteria and Performance Evaluation, 1998, IEEE, p. 703-707.*
Bauch, Gerhard; "Concatenation of Space-Time Block Codes and "Turbo" -TCM"; XP-000898047; Insitute for Communications Engineering (LNT, Munich University of Technology (TUM); 1999 IEEE; pp. 1202-1206.
Wyk, D.J. van, et al.; "On the Construction of Layered Space-Time Coded Modulation (STCM) Codes Employing MTCM Code Design Techniques"XP-000922301; DEFENCETEK. CSIR, Pretoria, South Africa; 1999 IEEE; pp. 2669-2973.
Wei, Lee-Fang; "Trellis-Coded Modulation with Multidimensional Constellations"; XP-000979357; IEEE Transactions on Information Theory, vol. IT-33. No. 4, Jul. 1987; pp. 483-501.
Tarokh, Vahid, et al.; "Space-Time Codes for High Data Rate Wireless Communication: Performance Criterion and Code Construction"; XP-002089112; IEEE Transactions on Information Theory, vol. 44, No. 2, Mar. 1998; pp. 744-765.
Gong, Yi, et al.; "Analysis and Design of Trellis Coded Modulation With Transmit Diversity for Wireless Communications"; XP-002196315; Center for Wireless information Technology; 2000 IEEE; pp. 1356-1361.
Terry, John D., et al.; Spherical Space-Time Codes (SSTC); XP-002196316; IEEE Communications Letters, vol. 5. No. 3, Mar. 2001; pp. 107-109.
Wei, Lee-Fang; "Coded M-DPSK with Built-In Time Diversity for Fading Channels"; 8097 IEEE Transactions on Information Theory, 39(1993) Nov. No. 6, New York, US; pp. 1820-1839.

* cited by examiner

*Primary Examiner*—Temesghen Ghebretinsae
*Assistant Examiner*—Sam K Ahn
(74) *Attorney, Agent, or Firm*—Arjun Krishnan

(57) ABSTRACT

Apparatus, and an associated method, for facilitating communication of data upon a communication channel which exhibits fading. Orthogonal transmit diversity techniques and trellis-coded modulation techniques are utilized to form a signal permitting the communication of data at high data rates while maintaining spectral efficiency, good error rate performance, without excessive computational complexity. The apparatus and associated method is advantageously implemented in a WLAN (Wireless Local Area Network) constructed pursuant to the IEEE 802.11 standard.

10 Claims, 6 Drawing Sheets

APPARATUS, AND ASSOCIATED METHOD, FOR FORMING A MODULATED SIGNAL UTILIZING OTD AND TCM TECHNIQUES

The present invention relates generally to communications in a radio communication system, such as a WLAN (wireless local area network), in which data is communicated upon a channel susceptible to fading. More particularly, the present invention relates to apparatus, and an associated method, by which to form a modulated signal containing the data. The modulated signal is formed utilizing Orthogonal Transmit Diversity (OTD) techniques as well as Trellis-Coded Modulation (TCM) techniques. Data is able to be communicated at high data rates, such as those required during operation of a communication system constructed to be operated pursuant to the specification set forth in the IEEE 802.11 standard.

BACKGROUND OF THE INVENTION

A communication system is formed, at a minimum, of a transmitting station and a receiving station interconnected by a communication channel. Communication signals generated by the transmitting station are transmitted upon the communication channel to be received by the receiving station.

A radio communication system is a communication system in which at least a portion of the communication channel is formed of a portion of the electromagnetic spectrum. Increased mobility of communications is permitted as a fixed or hard-wired connection is not required to be formed between the transmitting and receiving stations.

A cellular communication system is an exemplary radio communication system. A subscriber to a cellular communication system, when positioned at almost any location throughout an area encompassed by the network infrastructure of the cellular communication system, is able to communicate by way of the system with a mobile terminal.

The network infrastructure of an exemplary cellular communication system includes spaced-apart, fixed-site base stations which include transceivers. In such an exemplary system, each fixed-site base station defines a cell. As the mobile terminal used by the subscriber to communicate with another communication station travels between cells of the system, uninterrupted communication is possible by handing-over communications from one base station to another.

Several analogous types of wireless communication systems have been implemented, and others have been proposed, to encompass limited areas, such as the area encompassed by a building structure or office workplace. Wireless communication systems sometimes referred to as microcellular networks, private networks, and WLANs (wireless local area networks) are exemplary of such systems.

Wireless communication systems are typically constructed pursuant to standards promulgated by a regulatory or quasi-regulatory body. For instance, the IEEE 802.11 standard, and variants thereof, promulgated by the IEEE (Institute of Electrical and Electronic Engineering) is a wireless LAN standard pertaining generally to communications at various wireless frequencies including a 5 GHz range and a 2.4 GHz range. The 802.11 standard specifies an over-the-air interface between a wireless client, e.g, a mobile terminal, and a base station or access point, as well as among wireless clients. Standards pertaining to a physical layer and an MAC (media access control) layer are set forth in such standard. The standard permits automatic medium sharing between different devices which includes compatible physical layers. Asynchronous data transfer is provided for in the standard, generally by way of the MAC layer which utilizes a CSMA/CA (carrier sense multiple access with collision avoidance) communication scheme.

While the IEEE 802.11a standard requires that data be able to be communicated at relatively high data rates, e.g., data rates in excess of 54 Mbits/sec, achieving such a throughput rate is difficult when the communication channel upon which the data is transmitted exhibits fading characteristics. The high data rate communication is required to be effectuable within a stringent spectral efficiency range, a stringent error rate performance level and within appropriate computational load requirements. At a data rate of 96 Mbits/sec, a spectral efficiency of six bits/s/Hz, including coding, is required. The 96 Mbits/sec data rate is desired to be effectuated with an error rate performance at least as good as the error rate performance set forth in the IEEE 802.11a standard at a reduced rate, e.g., a 54 Mbits/sec data rate.

Generally, to overcome distortion introduced upon a signal transmitted upon a channel which exhibits fading characteristics, various techniques are utilized.

Time encoding of the signal, prior to its transmission, is sometimes utilized to counteract the distortion introduced thereon during its transmission upon the channel. Time encoding introduces signal redundancy upon the signal. By increasing the time redundancy of the signal, the likelihood that the informational content of the signal can be recovered, once received at the receiving station, is increased. Introducing time redundancy into the signal is sometimes referred to as creating time diversity.

Space diversity is sometimes also utilized to overcome the distortion. Typically, space diversity refers to the utilization of more than one transmitting antenna transducer from which a communication signal is transmitted, thereby to provide spatial redundancy.

And, various modulation techniques are also utilized. TCM (Trellis-Coded Modulation), for instance, is sometimes utilized. Conventional TCM techniques typically utilize an acceptable number of states, e.g., less than 256 states. But, a resultant trellis that is utilized in conventional TCM requires parallel transitions between states. The performance of a TCM scheme with parallel transitions provides almost no coding gain, relative to an uncoded communication scheme, when operated in a fading environment.

Multiple TCM is sometimes also utilized. In a TCM scheme, multiple coded symbols are transmitted during each transition in the trellis defined in the modulation scheme. Coding gains, sometimes almost 3 dB in magnitude, are sometimes achievable in the use of multiple TCM in contrast to conventional TCM. But, each increase in the effective length of the multiple-TCM requires another coded symbol to be added per transition. Additionally, each additional coded symbol requires another set of encoders, thereby increasing the complexity of the code. Additionally, coded symbols of the M-TCM require orthogonal channels for transmission. As spatial dimensions are generally not orthogonal, orthogonal time slots or frequency carriers are required to be used. The use of orthogonal time slots or frequency carriers would be contrary to the requirement to maintain spectral efficiency.

Additionally, trellis STC is sometimes utilized. When trellis STC is utilized, at least as many states are required as there are transitions per state. In other words, a trellis STC implementation would generally require at least 256 states. Such a trellis utilizing two-dimensional constellation is unable to provide a coding gain, merely a diversity gain, and thereby also is inadequate. ED-TCM (Enhanced Dimensional Trellis-Coded Modulation) is also sometimes utilized. In ED-TCM, subsets are selected from a Cartesian product constellation. Through such selection, though, the required spectral efficiency cannot be achieved.

As a result, while various modulation schemes are used to combat the effects of fading exhibited upon a communication channel, the existing modulation techniques are not able to ensure that data can be communicated at high data rates as required, e.g., pursuant to the IEEE 802.11 standard, while also maintaining acceptable spectral efficiency levels, error rate performance, and appropriate computation complexity levels.

If a manner could be provided by which better to modulate data which is to be communicated at high data rates upon a channel susceptible to fading, improved communication quality levels when operating a communication system would be possible.

It is in light of this background information related to wireless communications that the significant improvements of the present invention have evolved.

SUMMARY OF THE INVENTION

The present invention, accordingly, advantageously provides apparatus, and an associated method, by which to facilitate communications in a radio communication system, such as a WLAN (Wireless Local Area Network), in which data is communicated upon a channel susceptible to fading.

Through operation of an embodiment of the present invention, a manner is provided by which to form a modulated signal containing the data. The modulated signal is formed through the use of Orthogonal Transmit Diversity (OTD) techniques as well as Trellis-Coded Modulation (TCM) techniques. The resultant, modulated signal permits communication of data at high data communication rates while also maintaining high spectral efficiency, acceptable error rate performance, as well as also requiring only modest computational complexities.

In one aspect of the present invention, apparatus is provided for a sending station operable to send a communication signal representative of data to be communicated. At the sending station, trellis-coded modulation as well as orthogonal transmit diversity techniques are utilized to form a modulated signal containing data to be communicated upon a communication channel. Symbol sequences formed as a result of utilization of such techniques are applied to separate transmit antennas to be transduced therefrom.

The transmit antennas transduce the symbol sequences applied thereto, and the sequences are communicated upon communication channels to a receiving station. At the receiving station, the receive sequences are separated and receive circuitry operations are performed thereon to recreate the informational content of the data.

In one implementation, apparatus is provided for a sending station operable in a WLAN (Wireless Local Area Network) operable pursuant, e.g., the IEEE 802.11a standard, or a variant thereof. In a WLAN, fixed-site transceivers, sometimes referred to as access points, are positioned at selected locations. Access points communicate with mobile terminals positioned within a coverage area defined by the access points. Through operation of an embodiment of the present invention, fading exhibited upon channels connecting the access point and a mobile terminal is compensated for by forming signals in which orthogonal transmit diversity and trellis-coded modulation techniques are utilized.

In these and other aspects, apparatus, and an associated method, is provided in a communication system having a sending station for sending data upon a communication channel. The communication channel is susceptible to fading. Apparatus is provided for the sending station to convert the data into a form to facilitate communication thereof upon the communication channel. A multi-dimensional trellis-coded modulator is coupled to receive indications of the data to be sent by the sending station. The multi-dimensional trellis-coded modulator forms N-dimensional, trellis-encoded sequences therefrom. A first transmit antenna and at least a second transmit antenna is coupled to the multi-dimensional, trellis-coded modulator. A first N-dimensional sequence is transduced by the first transmit antenna, and a second N-dimensional transmit antenna is transduced by the second transmit antenna. The first and second N-dimensional sequences exhibit orthogonal transmit diversity.

A more complete appreciation of the present invention and the scope thereof can be obtained from the accompanying drawings which are briefly summarized below, the following detailed description of the presently-preferred embodiment of the invention, and the appended claims.

DETAILED DESCRIPTION OF THE PREFERRED EMBODIMENT

Figure 1:
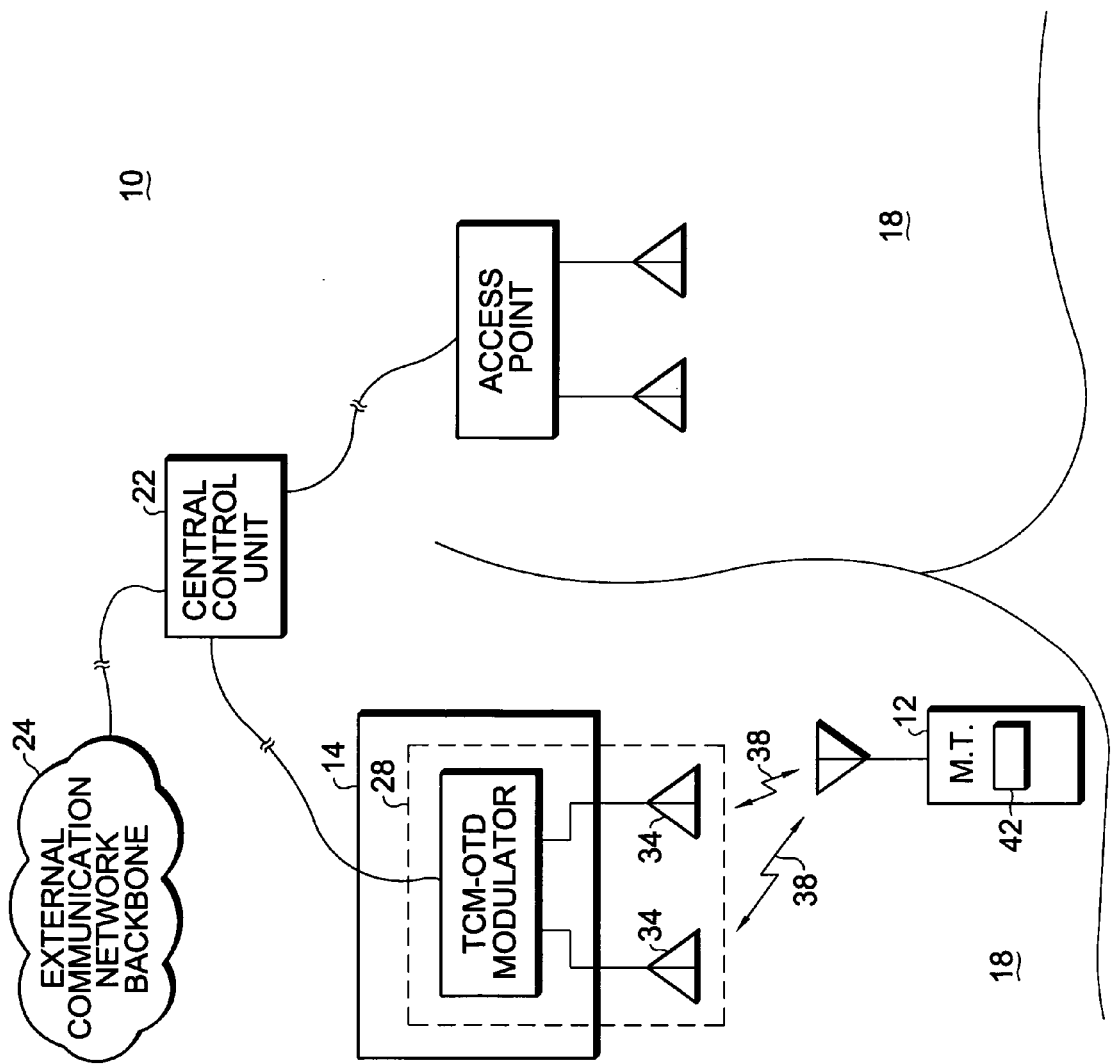
FIG. 1 illustrates a functional block diagram of a communication system in which an embodiment of the present invention is operable.

Referring first to FIG. 1, a communication system, shown generally at 10, provides for radio communications with mobile terminals, of which the mobile terminal 12 is exemplary, therein. In the exemplary implementation, the communication system 10 forms a WLAN (wireless local area network) which provides for radio communications with the mobile terminal as set forth in the IEEE 802.11 standard as well, potentially, pursuant to a proprietary mode of operation. Other communication systems can analogously be represented, and operation of an embodiment of the present invention is analogously also operable in such other communication systems.

In conventional manner, the WLAN includes a plurality of spaced-apart access points (APs) 14 positioned at spaced-apart locations. Two access points are shown in the Figure. In an actual WLAN, typically, in greater numbers of access points 14 are utilized. The access points 14 are sometimes referred to as base stations or RADs (remote antenna devices). The term "access point" shall generally be used herein to identify such devices as the devices form the points of access to the network infrastructure of the communication system.

The access points 14 include radio transceiver circuitry 16 capable of transceiving radio communication signals with mobile terminals when the mobile terminals are positioned within communication range of the access points. Generally, a mobile terminal communicates with an access point 14 when the mobile terminal is positioned within an area, referred to as a cell 18, proximate to, and defined by, the access point. The Figure illustrates a cell 18 associated with each of the illustrated access points.

The access points 14 are here shown to be coupled to a central control unit (CCU) 22. The CCU 22 provides control functions to control various aspects of operation of the WLAN. And, as shown, the CCU 22 provides for connections to an external communication network backbone 24. Although not separately shown, other communication devices, such as other communication stations and other communication networks are typically coupled to the communication network backbone 24. Thereby, a communication path can be formed to provide for communications between the mobile terminal 12 and communication stations coupled, either directly or indirectly, to the communication network backbone. Also, local communications between mobile terminals 12 are also permitted. In communications between pairs of mobile terminals, the communication path formed therebetween includes two separate radio-links.

In the exemplary implementation, the transceiver circuitry 16 forming a portion of each access point includes the apparatus 28 of an embodiment of the present invention. The apparatus 28 is operable to form a signal utilizing Orthogonal Transmit Diversity (OTD) as well as Trellis-Coded Modulation (TCM) techniques. The apparatus 28 is here shown to include an OTD-TCM (Orthogonal Transmit Diversity, Trellis-Coded Modulation) modulator 32. Symbol sequences formed by the modulator 32 are applied to a plurality, here two, antenna transducers 34 by way of the lines 36. The antenna transducers transduce the symbol sequences provided thereto into electromagnetic form, and the symbol sequences are sent upon communication channels 38 to be received at an appropriate mobile terminal 12. The mobile terminal 12 includes as a portion thereof, apparatus 42 operable, pursuant to an embodiment of the present invention, to operate upon receive signals corresponding to the signals transmitted by the access point 16. The apparatus 42, due to the nature of the modulated signals formed during operation of the apparatus 28 are separable into individual paths, thereby to facilitate recreation of the informational content of the data of which the signals are formed.

The multi-dimensional construction utilized pursuant to an embodiment of the present invention is predicated upon the integration of a convolutional code with a bandwidth-efficient modulation scheme. Such a combination is able to achieve significant coding gain compared to uncoded schemes without a corresponding reduction in data rate throughput or increasing bandwidth requirements to communicate the encoded data. The combination of the convolutional coding with a bandwidth-efficient modulation scheme here is trellis-coded modulation, entails encoding a bit-value data stream with a convolutional encoder and mapping the output coded bits to an expanded signal constellation.

Coding gain is achieved by partitioning the expanded signal set into subsets of increasing minimum squared distances. The convolutional encoder imparts a rule of correspondence such that shorter length transitions originating and returning to the state correspond to intersubset transitions. The longer length transitions correspond to intra-subset transition. This has the overall effect of increasing the minimum squared free distance in the trellis. The system yields a coding gain over an uncoded system provided that the power penalty associated with the expanded signal set is less than the gain in minimum squared free distance.

Multi-dimensional TCM is a generalized situation of the aforementioned trellis-coded modulation. The multi-dimensional construction of interest is referred to as the Wei construction. The Wei construction generates a two N-dimensional alphabet by utilizing a two-dimensional constellation in each one of N adjacent by the baud intervals. Thereafter, one redundant bit is added every N intervals. In contrast to a two-dimensional constellation, $2^{NM+1}$ signals are required in contrast merely $2^{M+1}$ signals. For large values of NM, the power penalty is considerably smaller than in a two-dimensional implementation.

In a multi-dimensional construction, the mapping between NM+1 bits and the signals may be converted into N simple constituent two-dimensional mappings. Also, the size of the constituent two-dimensional mapping is preferably maintained as small as possible. And, the peak-to-average power ratio is also kept as small as possible.

Figure 2:
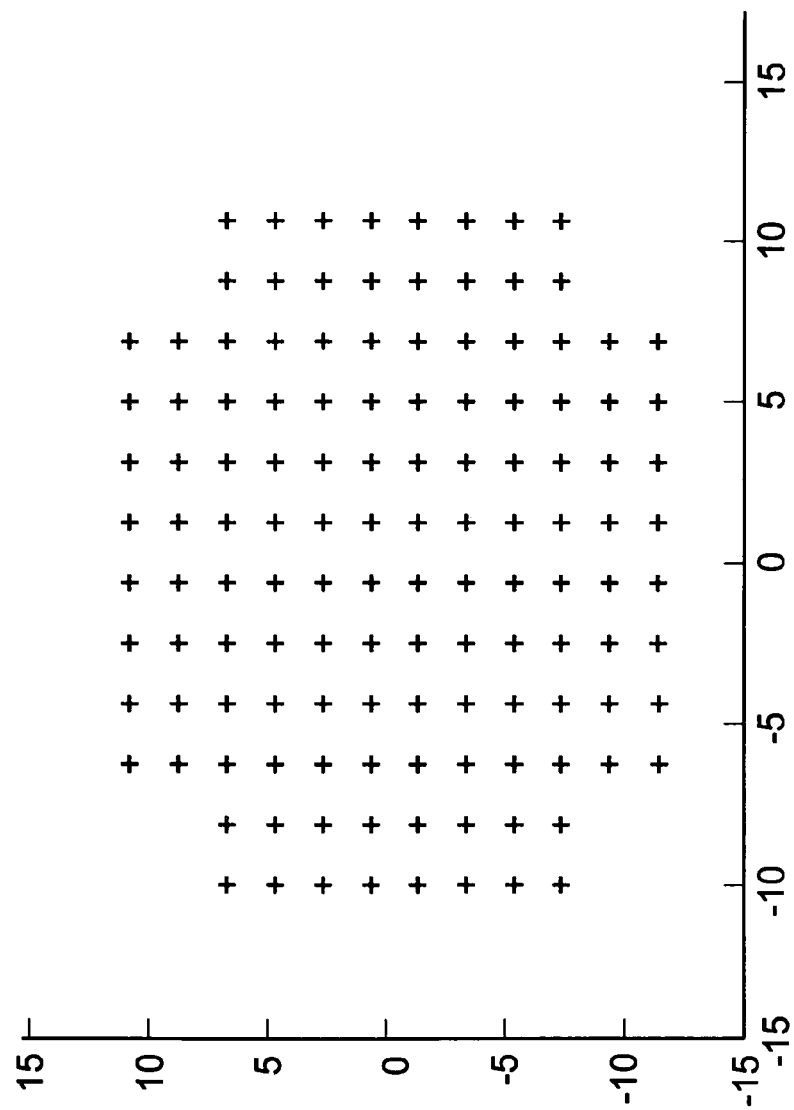
FIG. 2 illustrates a graphical representation of a 128 QAM symbol constellation.

FIG. 2 illustrates a constellation set, shown generally at 52, of a two-dimensional rectangular constellation having $2^Q$ signals. The constellation set forms a lattice, and added $1/N*2^Q$ signals are drawn from the same lattice but have as little average energy as possible.

Figure 3:
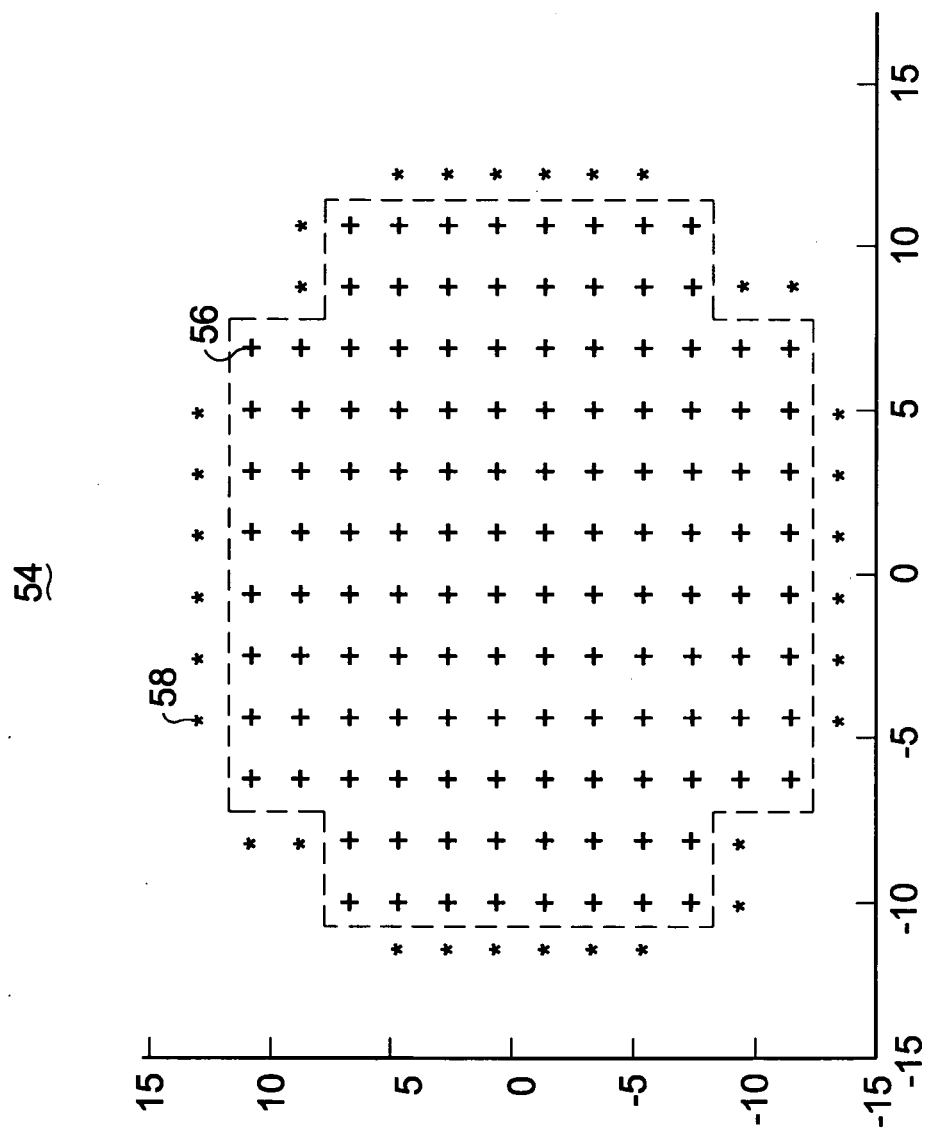
FIG. 3 illustrates a graphical representation of a TCM constellation utilized for 8-D signaling.
Figure 4:
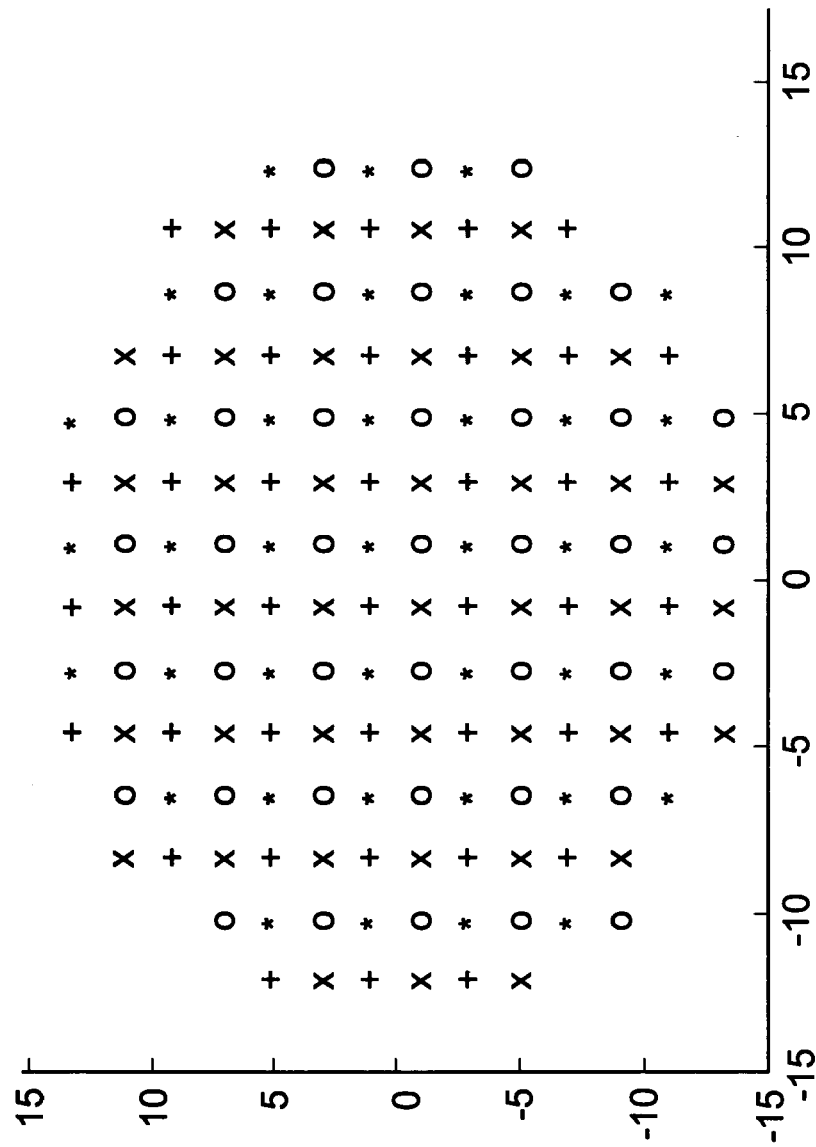
FIG. 4 illustrates a graphical representation of four constellations which have a minimum squared distance of $4d_0$.

Thereafter, the constellation is divided into two groups, an inner and an outer group. FIG. 3 illustrates a construction set 54, here identifying the inner group 56 and the outer group 58. $2^M$ signals form the inner group, and the inner group corresponds to the construction set 52 shown in FIG. 2. The inner group 56 is selected from the original constellation in order to keep the average power as small as possible. The outer group 58 is selected from the rest of the original constellation also so that the average power can be maintained as small as possible. FIG. 4 illustrates the set 54, here divided into four subconstellations. The subconstellations here exhibit minimum squared distances of $4d_0$.

A constellation of $2^{NM+1}$ signals is then constructed by concatenated N such two-dimensional constellations, and excluding the two N-dimensional signals corresponding to more than one two-dimensional outer signals. For each constituent two-dimensional constellation, the inner group is used to N−1 times as often as the outer group.

In an OFDM (Orthogonal Frequency Deletion Multiplexing) system, OTD (Orthogonal Transmit Diversity) is performable over the entire OFDM symbol. Use is made, for instance, of the Radon-Hurwitz unitary transform which is defined as:

$$R-H\begin{pmatrix} s_1 \\ s_2 \end{pmatrix} = \begin{bmatrix} s_1 & s_2 \\ -s_2^* & s_1^* \end{bmatrix}. \tag{1}$$

Figure 5:
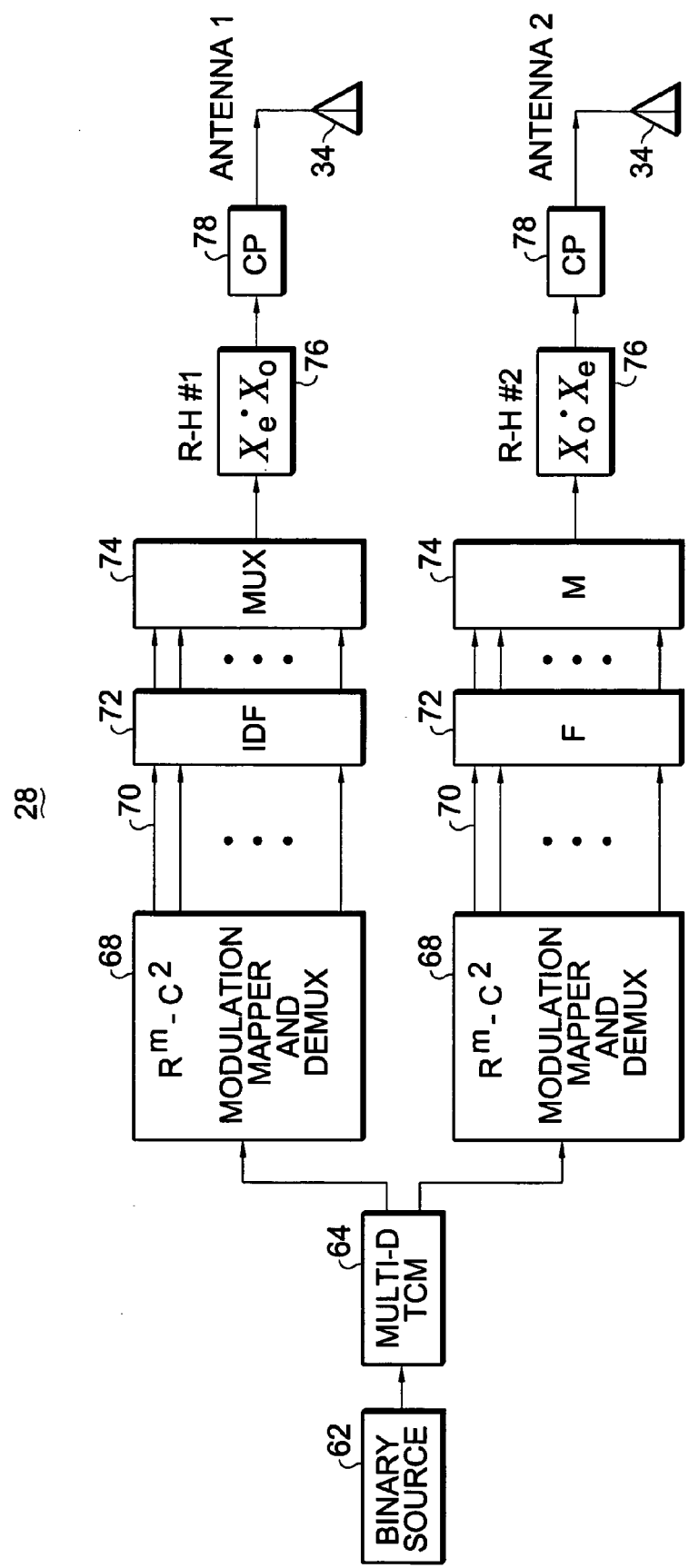
FIG. 5 illustrates a functional block diagram of the apparatus of an embodiment of the present invention.

FIG. 5 illustrates again the apparatus of 28 of an embodiment of the present invention. Here, the data to be communicated by the access points to a mobile terminal is designated to be sourced at the binary source 62. The data is provided to a multi-dimensional TCM modulator 64. The modulator is operable to perform multi-dimensional, TCM modulation operations and to generate symbol sequences on the lines 66 to be applied to modulation mapper and demultiplexers 68 formed on separate paths. Output symbols on the lines 70 are provided to element 72 and, in turn, to element 74, and thereafter multiplexed outputs therefrom are provided to Radon-Hurwitz transformer 76. Radon-Hurwitz transforms are performed thereat and thereafter provided to CP element 78 and, in turn, to transmit antennas 34.

Two consecutive OFDM symbols are, for purposes of explanation, referred to $X_oX_e$. At a first transmitter, $X_O$ is transmitted during a first time epoch followed by $X_e$ during a second time epoch. And, at a second transmitter $-X_e^*$ is transmitted during the first time epoch followed by transmission of $X_O^*$ during the second time epoch.

The use of the Radon-Hurwitz transform with spaced-time codes is advantageous as utilization of the transform allows the individual paths at the receiver to be separated.

For instance, by denoting diagonal matrices containing the DFT's of channel response vectors for the separate transmitter portions as $\Lambda_1$ and $\Lambda_2$, respectively. By assuming that the communication channel upon which the symbols are to be transmitted is constant over two consecutive time epochs, the demodulated receive signals at the respective time slots are governed by the following:

$$Y_1 = \Lambda_1 X_o - \Lambda_2 X_e^* \qquad (2)$$
$$Y_2 = \Lambda_1 X_e + \Lambda_2 X_o^*.$$

Through appropriate substitution, the estimates of the consecutive OFDM symbols are represented as follows:

$$\hat{X}_o = \Lambda_1^* Y_1 + \Lambda_2 Y_2^* \qquad (3)$$
$$\hat{X}_e = \Lambda_1^* Y_2 - \Lambda_2 Y_1^*.$$

Through additional substitution, the following is representative of the OFDM symbols:

$$\hat{X}_o = (|\Lambda_1|^2 + |\Lambda_2|^2)Y_1 \qquad (4)$$
$$\hat{X}_e = (|\Lambda_1|^2 + |\Lambda_2|^2)Y_2$$

Thereby, OTD techniques are shown to improve the performance of TCM over fading channels. Assuming the two channels fade independently, then the average performance of Radon-Hurwitz/TCM approaches the performance of TCM over AWGN (Average White Gaussan Noise) provided that the expected value of the sum of the squares of the channel coefficients equal unity.

Figure 6:
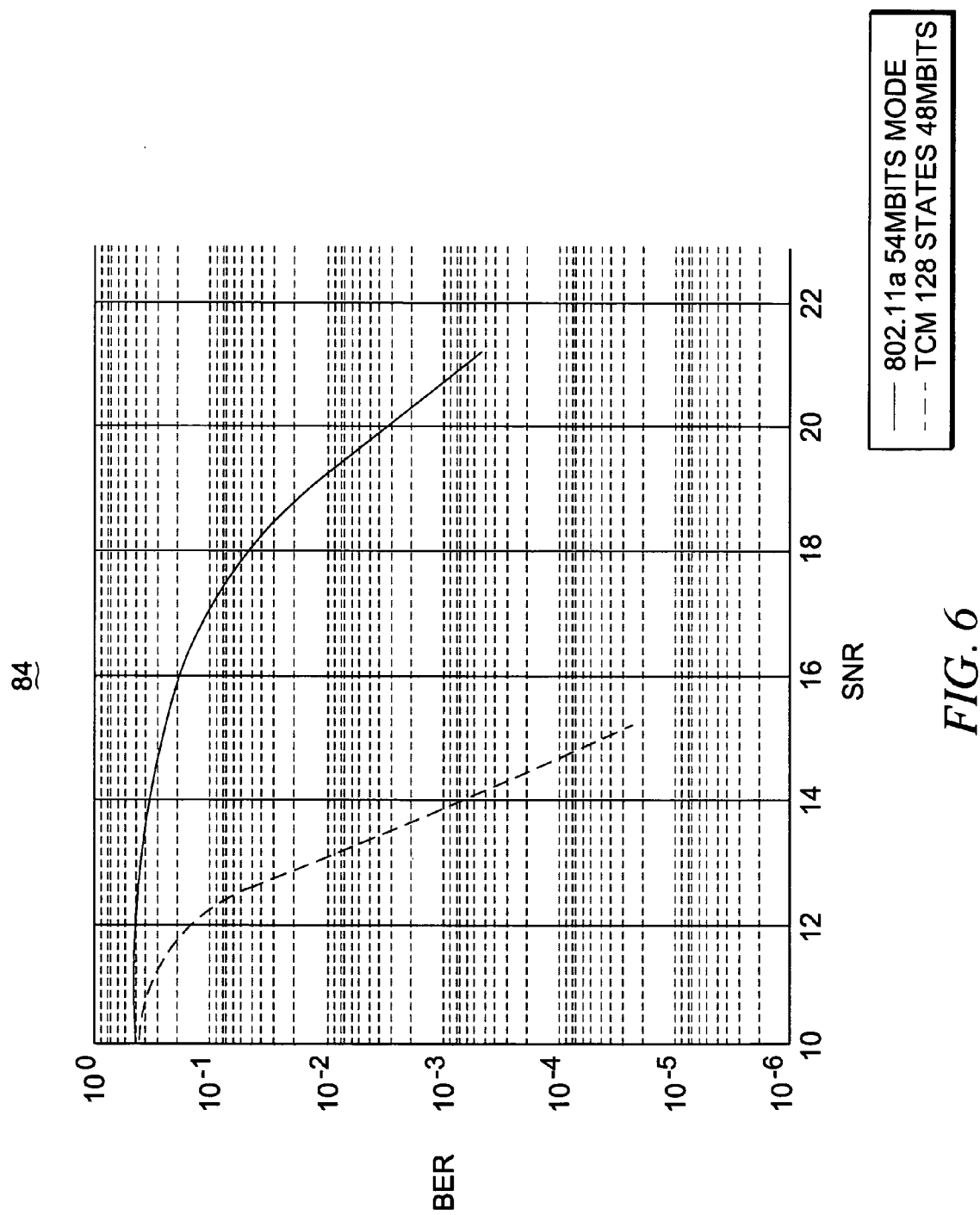
FIG. 6 illustrates a graphical representation of the bit error rate plotted as a function of a signal-to-noise ratio of a signal received at a receiving station during operation of an embodiment of the present invention.

FIG. 6 illustrates a graphical representation, shown generally at 84. The representation is a plot 84 of an exemplary performance of the bit error rate as a function of signal-to-noise ratio of symbol sequences transmitted during operation of an embodiment of the present invention. Analysis of the graphical representation indicates that there is considerable improvement of communication quality upon fading channels without degradation over AWGN channels.

OFDM systems achieve frequency diversity by utilizing a wideband signal. This diversity is better utilized when TCH is combined with OFDM, if the transmitted symbols are interleaved in frequency. Interleaving distributes the symbols over a wide frequency spacing that is wider than the coherence bandwidth of the channel. This further improves the performance, as most of the time, consecutive interleaved symbols do not experience deep fades.

While, in the exemplary implementation, the apparatus of an embodiment of the present invention is shown as a portion of a WLAN constructed pursuant to the IEEE 802.11 standard, operation of an embodiment of the present invention can also analogously be implemented in other communication systems in which communication is effectuated upon communication channels susceptible to fading.

The preferred descriptions are of preferred examples for implementing the invention, and the scope of the invention should not be necessarily be limited by this description. The scope of the present invention is defined by the following claims.

We claim:

1. Apparatus for a communication system having a sending station for sending data upon a communication channel, the communication channel susceptible to fading, said apparatus for the sending station for converting the data into a form to facilitate communication thereof upon the communication channel, said apparatus comprising:
a multi-dimensional trellis-coded modulator having a signal constellation partitioned into subsets of increasing minimum squared distances, and coupled to receive data to be sent by the sending station, said multi-dimensional trellis-coded modulator for convolutionally encoding the data according to a rule of correspondence comprising defining intrasubset transitions to correspond to longer-length transitions, and defining intersubset transitions to correspond to shorter length transitions, and for mapping the data, once encoded, to the signal constellation, and forming N-dimensional, trellis-encoded sequences therefrom, the N-dimensional, trellis-encoded sequences of dimensional values greater than two;
a first transmit antenna and at least a second transmit antenna coupled to said multi-dimensional, trellis-coded modulator, a first N-dimensional sequence of the N-dimensional, trellis-encoded sequences transduced by said first transmit antenna and a second N-dimensional sequence of the N-dimensional, trellis-encoded sequences transduced by said second transmit antenna, the first and second N-dimensional sequences exhibiting orthogonal transmit diversity.

2. The apparatus of claim 1 wherein the multi-dimensional trellis-coded modulator utilizes a Wei construction.

3. The apparatus of claim 1 wherein the first and second N-dimensional sequences applied to said first and second transmit antennas, respectively, comprise Radon-Hurwitz transforms.

4. The apparatus of claim 1 further comprising a mapper coupled between said multi-dimensional trellis coded modulator and said first and at least second transmit antennas, said mapper for mapping OFDM (Orthogonal Frequency Division Multiplexer) symbols to said first and second transmit antennas.

5. The apparatus of claim 1 wherein the communication system forms a WLAN (Wireless Local Area Network) having an access point and wherein said multi-dimensional trellis-coded modulator and said first and second transmit antennas form portions of the access point.

6. The apparatus of claim 5 wherein the data communicated by said first and second transmit antennas is communicated at a rate specified by an IEEE 802.11(a) standard.

7. A method for communicating in a communication system having a sending station for sending data upon a communication channel, the communication channel susceptible to fading, said method for converting the data into a form to facilitate communication thereof upon the communication channel, said method comprising:
convolutionally encoding the data according to a rule of correspondence comprising defining intrasubset transitions to correspond to longer length transitions and defining intersubset transitions to shorter length transitions;

mapping the data, once encoded during said operation of convolutionally encoding, to a signal constellation, the signal constellation positioned into subsets of selected increasing minimum squared distances;

modulating the data to be communicated upon the communication channel to form N-dimensional, trellis-encoded sequences therefrom, the N-dimensional, trellis-encoded sequences of dimensional values greater than two; and applying a first N-dimensional trellis-encoded sequence formed during said operation of modulating to a first transmit antenna and at least a second N-dimensional trellis-encoded sequence formed during said operation of modulating to at least a second transmit antenna, the first and second N-dimensional trellis-encoded sequences exhibiting orthogonal transmit diversity.

8. The method of claim 7 wherein the first and second N-dimensional sequences applied to the first and second transmit antennas, respectively, comprise Radon-Hurwitz transforms.

9. The method of claim 7 wherein the communication system comprises a WLAN (Wireless Local Area Network) having an access point and wherein said operations of modulating and applying are performed at the access point.

10. The method of claim 9 wherein the first and second N-dimensional trellis-encoded sequences are applied during said operation of applying at rates specified pursuant to an IEEE 802.11(a) standard.

* * * * *